3,329,472
BEARING UNITS
Gerald Lowe Donnellan and Cedric George Delforce, Clevedon, England, assignors to Ampep Industrial Products Limited, Somerset, England, a British company
Filed Aug. 10, 1964, Ser. No. 388,484
Claims priority, application Great Britain, Aug. 13, 1963, 32,013/63
6 Claims. (Cl. 308—3)

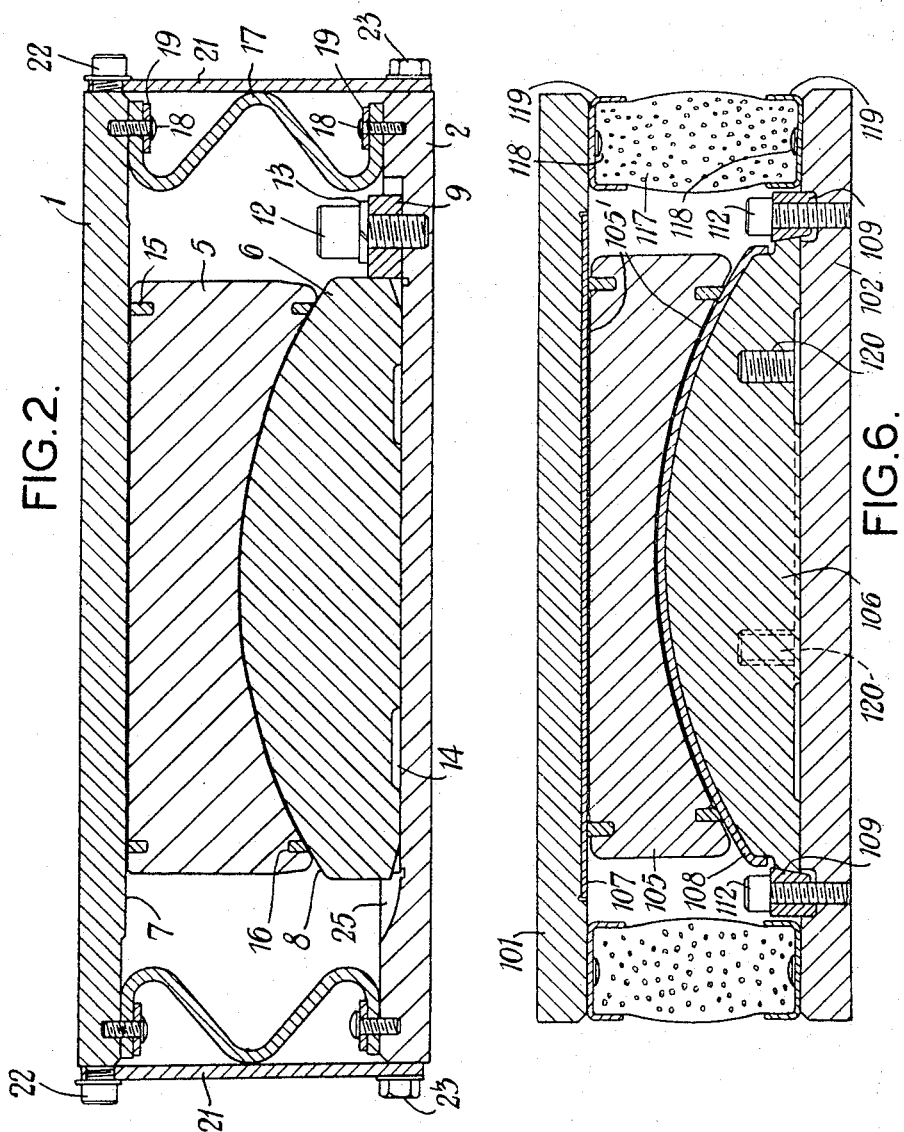

This invention relates to bearing units for use in bridge and other constructions to accommodate movement between structural members, and is concerned with a generally improved unit of this nature which is of simple robust form and capable of effective operation over long periods without maintenance.

Accordingly, the invention provides a bearing unit having outer members with inwardly facing bearing surfaces separated by an interposed pad member, the said bearing surfaces being respectively flat and part-spherical and the pad member having opposed surfaces which correspond to the bearing surfaces and which respectively seat slidably against said bearing surfaces so that the bearing unit can adjust itself to accommodate relative parallel movement and/or relative angular displacement between said outer members.

Figure 1:
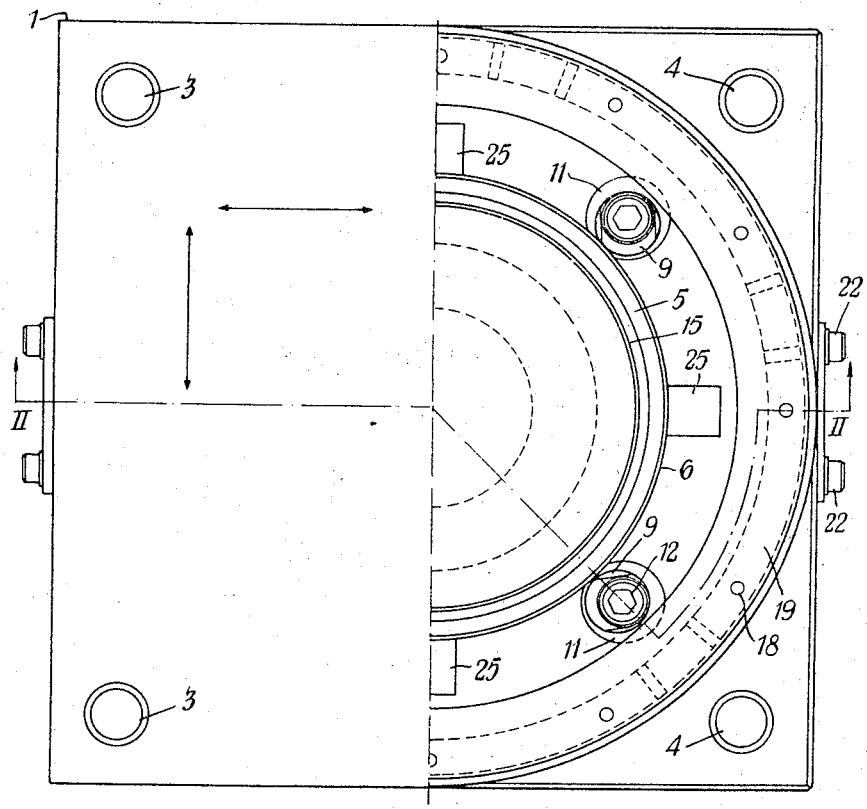
Figure 4:
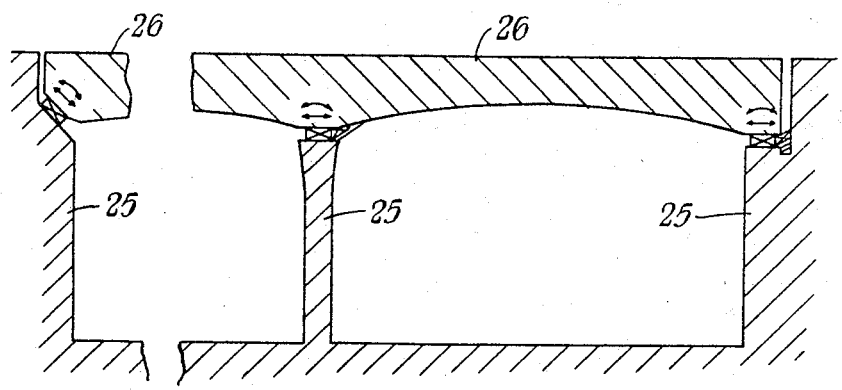
Figure 3:
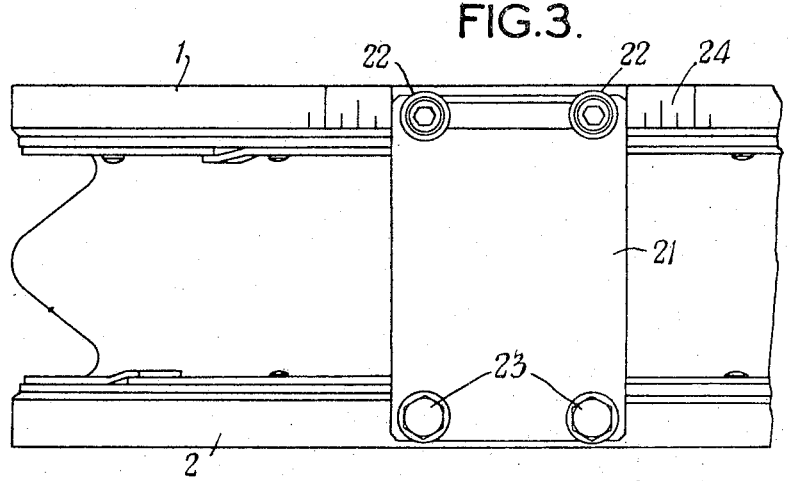
Figure 5:
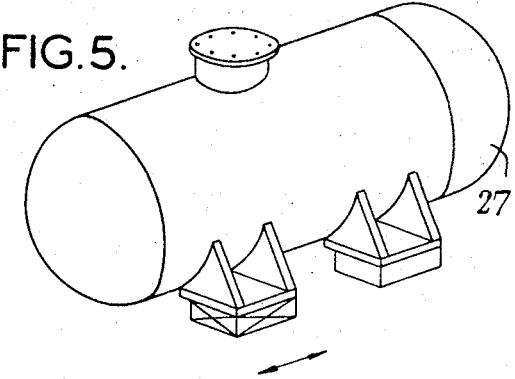
Figure 7:
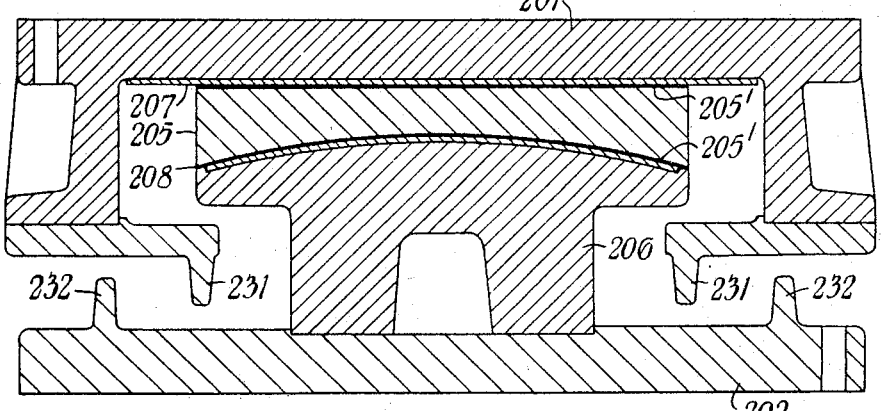

In order that the invention may be more fully understood, three forms of bearing unit in accordance with the invention will now be described, by way of example, with reference to the accompanying drawings in which:

FIGURE 1 shows a plan view of the first form of bearing unit with the top plate of the unit partially removed, FIGURE 2 shows a section taken along the line II—II in FIGURE 1, FIGURE 3 shows a partial elevation of the unit, FIGURE 4 shows diagrammatically a bridge structure incorporating a bearing unit of the invention, FIGURE 5 shows diagrammatically a pressure vessel provided with a bearing unit of the invention, FIGURE 6 shows a sectional elevation of a second form of bearing unit, and FIGURE 7 shows a similar view of a third form of bearing unit.

Referring to FIGURES 1–3, a bearing unit suitable for use in a bridge construction incorporates two rectangular outer plate members 1 and 2. These outer plate members 1 and 2 are made of steel, the upper member being of stainless steel, and the members are provided with fixing holes 3 and 4 respectively. When the bearing unit is in a centred rest position, the members are disposed in substantially parallel relationship by a floating pad member 5 interposed between the upper plate member 1 and a stainless steel block 6 secured to the plate member 2.

To accommodate the pad member, the inner face of the plate member 1 is provided with a flat bearing surface 7 and the opposite face of the block 6 is provided with a convex part-spherical or domed bearing surface 8 which extends towards the flat bearing surface 7 and is separated therefrom by the pad member 5 as aforesaid. The block 6, which has a generally flat under face, is located in a recess in the plate member 2 by four eccentric collars 9 (only two of which are shown in FIGURE 1) which are positioned in recesses 11. The collars, which are each secured to the plate member 2 by a bolt 12 provided with a spring washer 13, are provided with flats whereby they can be partially rotated by a spanner so as to exert a lateral clamping action on the block. The latter is also formed with a shallow groove 14 on its under face to provide a clearance which may be filled with bonding or adhesive material, for example the material sold under the name "Araldite."

The pad member 5 is itself made of a spheroidal graphite cast iron such as the material sold under the name "Meehanite" and has a flat upper face which slidably seats against the bearing surface 7. The opposite pad face has a concave part-spherical shape slidably to seat over the domed or part-spherical bearing surface 8. Alternatively, it would of course be possible to interchange the concave and domed convex part-spherical surfaces on the block 6 and pad 5.

In order to exclude dirt and moisture from the bearing unit, a groove is provided around each of the seating faces of the pad member, with the grooves inset slightly from the pad edge, and continuous flexible or elastomeric seals 15 and 16 of ethylene propylene, polyurethane, rubber or other suitable material are located one in each groove so as to project therefrom into sealing contact with the respective bearing surfaces on the plate member and the block 6. A flexible or elastomeric dust seal 17 is provided between the facing margins of the outer plate members so as to surround the bearing surfaces and interposed pad member. The seal 17 is secured to the respective plates by bolts 18 passing through arcuate washers 19 which may overlap as indicated in FIGURE 3. This sealing ring is, of course, extremely flexible and therefore does not interfere with relative movement between the outer plate members.

In order to maintain the components of the bearing unit in the correct relative position during transportation of the unit prior to fitting, the plate members 1 and 2 are secured by clamp plates 21 bolted to the respective plate members by bolts 22 and 23. To enable the unit to be fitted with any desired relative offset between the plate members a graduated scale is provided on the plate member 1 for cooperation with a side edge of each plate 21. Here it should be explained that the unit may be incorporated in a bridge structure as will later be described to support a crossing structural member of the bridge. The provision of the scale 24 allows the members 1 and 2 to be set in the correct position notwithstanding any extremes of ambient temperature effecting the length of the crossing member. One of the bolts 22 of each plate 21 will, of course, be removed to allow the other bolt to slide in the slot in the plate 21. The clamp plates are preferably of synthetic resinous material so that they will be sheared when load is applied to the unit. Alternatively they may be metallic in which case they would be removed after fitting of the unit. In a further alternative the bolts are of synthetic resinous material so that, if the plates are left in place, the bolts will shear when load is applied to the unit.

Two applications of the bearing unit will now be described.

In the employment of the bearing unit in a bridge structure (FIGURE 4) one of the aforesaid outer plate members may be secured, for example, to the top of a bridge pier 25, whilst the other outer plate member carries a crossing structural member 26 of the bridge. Alternatively, of course, the bearing unit could be used between any other two members of a bridge structure which require interconnection whilst allowing relative movement therebetween, the unit being completely reversible and usable in any desired position according to requirement. The construction of the bearing unit enables the outer plate members thereof to move relatively to one another not only in substantially parallel planes but also in an angular relationship, that is to say angular movement of one of the plate members relative to the other either in the plane of the one member or in a plane perpendicular to the other member. Clearly one of the plate members may undergo a movement relative to the other member which is a combination of these three movements. Thus movements resulting from expansion and contraction of interconnected structural members can be readily accommodated, as well as any misalignment of the aforesaid members from whatever cause. For example, such misalignment might be due to bowing or twisting of one or both of the connected structural members, to variations between individual pier heights, or to various manufacturing or installation inaccuracies within the tolerances allowed. The employment of bearing units such as described, thus greatly increases the permissible tolerances in a bridge construction and thereby correspondingly, facilitates the construction. The bearing unit may require a spreader plate interposed between the top plate member of the unit and the supported bridge structural member. This serves to limit the stresses in the top plate of the bearing which plate may then be thinner than where a spreader plate is not used, that is, when the unit directly supports the structural member. In the latter case the top plate would be of greater thickness to limit the stresses to a reasonable figure.

Referring back to FIGURES 1 and 2 it will be noted that four slots 25 (three of which are shown) may be formed in the plate member 2, to merge with the recess in which the block is located, the purpose of which slots is to provide crow-bar lifting points for the block 6. Should it be necessary to replace either the pad 5 or the block 6, the structural member 26 of the bridge would be first jacked up. It is of interest to note that the height through which the bridge member need be jacked up is only approximately ½" for a 100-ton bearing. Then, after removal of the seal 17 and release of the bolts 12, a crow-bar is inserted in the crow-bar points to engage underneath the block, the lower corner of which is chamfered, in order to break the joint between the block 6 and the plate 2 whereafter the latter together with the pad 5 may be withdrawn clear of the plates 1 and 2.

In a second application two bearing units of the invention are included in the four bearing units supporting a pressure vessel 27 (FIGURE 5). Only two of the bearing units are shown including one unit of the invention. Although in many installations it will be sufficient, where four bearings are employed, to incorporate two units of the invention, if desired all four may be those according to the invention. It will be seen that in this application the bearing unit of the invention fulfills many of the functions mentioned in connection with the bridge structure in particular any change in length of the vessel 26 can readily be accommodated.

Referring now to FIGURE 6, this form of bearing unit is largely similar to the unit illustrated in FIGURES 1–3, and it has the same applications. However the unit of FIGURE 6 has certain constructional differences. The plate members 101, 102 are of steel and the pad member 105 and the block 106 are material sold under the name "Meehanite." The flat bearing surface 107, however, is constituted by a stainless steel plate which is inset into the material of the plate member 101 and is bonded or stuck in position or secured in any known manner. The domed bearing surface 108 is similarly constituted by a stainless steel plate which is secured to the block 106 in any suitable manner. In this form of bearing unit, the opposed faces of the pad member 105 are provided with facings or linings 105' in the form of a low-friction woven or knitted fabric composed of or incorporating synthetic fibres e.g. polytetrafluoroethylene, nylon, courtelle or terylene. The linings may alternatively be on the plate members 101, 102.

The method of mounting the block 106 is slightly different to the method employed in the above described unit. Here the block is clamped down on the plate member 102 by bolts 112 extending through collars 109 which each have an inclined side surface engaging a correspondingly inclined side surface of the block 106. Although this method and the method described with reference to FIGURES 1–3, represent two ways in which the block may be secured to the associated plate member, the block may be simply secured by bolts passing through the lower plate member or it may be bonded in position or even rested on the plate as the frictional forces required to move it will normally be greater than at the bearing surface. Threaded bores for receiving bolts, if these are used, are indicated at 120 in FIGURE 6. The seal 117 which surrounds the pad member and block 105, 106 may be formed of flexible or elastomeric material. Furthermore the seal may be secured by the provision of facing channels 119 bolted at 118 to the respective plate members 101, 102.

The unit of FIGURE 6 may have crow-bar points as described for the first unit, to enable, after jacking up of the structure being supported on the bearing, the withdrawal of assembly 105, 106. The small amount of jacking required as mentioned earlier does not appreciably disrupt any pipe, electric or gas services, and would not stress the secondary structure in (for instance) a machine tool.

Referring now to FIGURE 7, in this form of unit the plate members are of steel and the block 206 formed with the parts-spherical bearing surface is secured integrally to the inner face of the lower plate member 202 so as to upstand therefrom towards the inner face of the opposite plate member 201. The bearing surfaces 207 and 208 of the plate 201 and of the block 206 are again each constituted by a stainless steel plate which, in the case of the block 206, is in the form of an insert whilst the other plate is merely secured to the surface of the plate 201. The opposed faces of the pad member 205, which is of "Meehanite," are lined or faced at 205' in the same manner as the corresponding faces in the unit of FIGURE 6. In this embodiment of the invention, the permitted relative movements between the outer plate members 201, 202 are positively limited by the abutment of lateral flanges 231, 232 which extend inwardly from the respective plate members 201, 202 and are located one within the other in overlapped relationship. The facing surfaces of these flanges may also be lined or faced with appropriate bearing material or materials. Sealing of the bearing surfaces may again be provided conveniently by a flexible or elastomeric seal, not shown, which would be disposed between the plate margins or in any other manner.

The dimensions of the three bearing units described above would of course vary according to the particular uses to which the unit may be put. The unit will however, in any case normally be dimensioned so that the movements permitted between the outer plate member are sufficient to accommodate all normal movement likely to take place between the structural members interconnected by the unit. Whilst the use of the units in bridge constructions and in the mounting of pressure vessels has been specifically referred to, it will be appreciated that a bearing unit of the invention also has a wide variety of other uses as, for example, to accommodate expansion of pipes in a refinery installation carrying hot or cold fluids, in long boilers, in other parts of processing plants, in the mounting of large machine tools, or of wide roof and floor spans and in fact in any structure where movement in longitudinal and/or rotational directions is required to be accommodated between parts without imposing undesired restraint. The envisaged loads to which the bearing units may be subjected approach 5000 tons.

Although in the above three forms of bearing unit, the seating surfaces between the upper plate member and the pad member and between the latter and the block have been stainless steel against cast iron, one surface of each pair of seating surfaces being optionally lined or faced with low friction fabric material, other known combinations of metallic bearing materials may be used, for example, stainless (or corrosion resistant) steel against bronze or steel against bronze. The bearing surfaces on the upper plate member and the block or the opposed surfaces on the pad may be constituted by a lining of hard wearing bearing material on a suitable backing material, the bearing material being for instance, cast into position, rolled, friction welded, welded as a sheet, deposited as a hard surface by melting with a gas torch or plated. Suitable plated materials include nickel and chromium and deposited materials include carbides and hard chromium. It may be necessary to arrange for elimination of electro-chemical attack, and this can be done by suitable choice of interposed pad, bearing or backing materials, if metallic, or by insertion of Araldite or other suitable bonding agent that will act as an insulator. Depending upon requirements the bearing surfaces on the upper plate member and on the block or the opposed surfaces of the pad may be of non-metallic hard wearing bearing material. Examples of non-metallic bearing material which may be employed include polyamide or superpolyamide resins, condensation products of the polyisocyanates, polyester resins, polyethane and fluorocarbon polymers. In the case of metallic liners, any of the well-known bearing metals may be employed either with or without additives or in combination with resinous material.

Whilst the dust seal of each of the above three units has been described as being of flexible or elastomeric type, this may, in FIGURE 7, comprise a semi-liquid type of seal through which the upper plate moves during movement of the supported structure. In the other bearing units described, the plate member may be modified to provide inwardly extending flanges so that a semi-liquid type of seal may be fitted.

The bearing units as described have the important advantage of being capable of use for a very long period without the need for any special maintenance. In particular if suitable bearing surfaces are empolyed made of modern bearing materials, the unit can be operated dry without the need for lubrication.

We claim:
1. A structural bearing unit comprising a pair of spaced members, said members having opposed bearing surfaces, a movable pad element disposed between and coacting with the bearing surfaces of said members whereby said members may move parallel or angularly relative to each other when subjected to certain bearing loads, and means secured to said members to maintain the members in a predetermined position, said means being made of a shearable material whereby said means will break when said certain bearing loads are imposed on said members.

2. A bearing unit as set forth in claim 1 wherein said members are comprised of plates maintained in an initially parallel relationship by said shearable means.

3. A structural bearing unit comprising a pair of spaced members, said members having opposed bearing surfaces, a movable pad element disposed between and coacting with the bearing surfaces of said members whereby said members may move parallel or angularly relative to each other when subjected to certain bearing loads, first seal means secured between said members and enclosing said bearing surfaces and said pad element, and second seal means secured to said pad element and coacting with said bearing surfaces, and means secured to said members to maintain the members in a predetermined position, said means being made of a shearable material whereby said means will break when certain bearing loads are imposed on said members.

4. A structural bearing unit comprising a first plate member having a bearing surface formed thereon, a second plate member including a centrally recessed portion, a block element disposed within said centrally recessed portion and removably secured to said second plate member, said block element including a bearing surface disposed opposite the bearing surface on said first plate member, a movable pad member disposed between said first plate member and said block element and coacting with said bearing surfaces whereby said plate members may move parallel or angularly relative to each other when subjected to certain bearing loads, said plate members extending substantially beyond said block element and said floating pad member, slot means formed in that portion of said second plate member extending beyond said block element, said slot means projecting beneath said block element.

5. A bearing unit as set forth in claim 4 which includes elastomeric sealing means secured between said plate members so as to enclose said floating pad element and said slot means.

6. A bearing unit as set forth in claim 4 which includes shearable means secured to said plate members to maintain the members in a predetermined position when the bearing unit is initially assembled.

References Cited
UNITED STATES PATENTS

| | | | |
|---|---|---|---|
| 1,721,009 | 7/1929 | Drake | 308—3 |
| 1,735,881 | 11/1929 | Seastedt. | |
| 1,781,517 | 11/1930 | McKeown | 308—6 X |
| 2,014,643 | 9/1935 | Bakker | 52—573 X |
| 2,443,856 | 6/1948 | Hermonny | 308—237 X |
| 2,448,936 | 9/1948 | Van Zandt | 308—238 X |
| 2,498,994 | 2/1950 | Laudig. | |
| 2,513,684 | 7/1950 | Shenk | 308—3 |
| 2,680,259 | 6/1954 | Milk | 14—16 |
| 2,711,352 | 6/1955 | Hasko | 308—72 |
| 2,719,761 | 10/1955 | Bonnofe | 308—3 |
| 3,169,807 | 2/1965 | Abel | 308—9 |
| 3,233,376 | 2/1966 | Naillon | 308—3 X |

MARTIN P. SCHWADRON, *Primary Examiner.*

L. L. JOHNSON, *Assistant Examiner.*